United States Patent [19]

Waclawsky et al.

[11] Patent Number: 5,226,041
[45] Date of Patent: Jul. 6, 1993

[54] METHOD FOR EFFICIENTLY SIMULATING THE DYNAMIC BEHAVIOR OF A DATA COMMUNICATIONS NETWORK

[75] Inventors: John G. Waclawsky, Frederick; Kyra L. Marshall, Poolesville, both of Md.

[73] Assignee: International Business Machines Corporation, Armonk, N.Y.

[21] Appl. No.: 658,494

[22] Filed: Feb. 21, 1991

[51] Int. Cl.⁵ ................................ H04J 3/26
[52] U.S. Cl. ......................... 370/60; 370/94.1
[58] Field of Search .............. 370/94.1, 82, 105.1, 370/85.15, 110.1, 60, 61; 371/33

[56] References Cited

U.S. PATENT DOCUMENTS

| | | | |
|---|---|---|---|
| 4,862,461 | 8/1989 | Blaner | 371/33 |
| 4,893,307 | 1/1990 | McKay | 370/94.1 |
| 4,941,143 | 7/1990 | Twitty | 370/94.1 |
| 4,982,185 | 1/1991 | Holmberg | 370/44.1 |
| 5,007,051 | 4/1991 | Dolkas | 370/110.1 |
| 5,014,265 | 5/1991 | Hahne | 370/61 |

OTHER PUBLICATIONS

Mischa Schwartz, "Telecommunication Networks: Protocols, Modeling and Analysis".

*Primary Examiner*—Douglas W. Olms
*Assistant Examiner*—Melvin Marcelo
*Attorney, Agent, or Firm*—John E. Hoel

[57] ABSTRACT

An efficient method is described for predicting the performance of a data communications network operating under a window-based protocol. A state characterizing the dynamic behavior of the data communications network for consecutive operating cycles is computed. A pattern for the state is then determined having a particular repetition period. The number of data packets which are transmitted during that repetition period are then used to characterize the throughput, transit time and other performance characteristics for the data communications network.

5 Claims, 6 Drawing Sheets

CYCLE 13     STATE W, Q1, Q2 = 6, 4, 6

| CYCLE 1 | STATE W, Q1, Q2 = 2, 0, 0 |
| CYCLE 2 | STATE W, Q1, Q2 = 3, 1, 1 |
| CYCLE 3 | STATE W, Q1, Q2 = 4, 2, 2 |
| CYCLE 4 | STATE W, Q1, Q2 = 5, 3, 4 |
| CYCLE 5 | STATE W, Q1, Q2 = 6, 4, 6 |
| CYCLE 6 | STATE W, Q1, Q2 = 5, 3, 6 |
| CYCLE 7 | STATE W, Q1, Q2 = 4, 2, 4 |
| CYCLE 8 | STATE W, Q1, Q2 = 5, 3, 4 |
| CYCLE 9 | STATE W, Q1, Q2 = 6, 4, 6 |
| CYCLE 10 | STATE W, Q1, Q2 = 5, 3, 6 |
| CYCLE 11 | STATE W, Q1, Q2 = 4, 2, 4 |
| CYCLE 12 | STATE W, Q1, Q2 = 5, 3, 4 |
| CYCLE 13 | STATE W, Q1, Q2 = 6, 4, 6 |

Cycles 4–7: PERIOD = 20 PACKETS
Cycles 8–11: PERIOD = 20 PACKETS
Cycles 12–13: EXTRAPOLATE FOR ANOTHER 57 PERIODS TO TRANSMIT A TOTAL OF 10,000 PACKETS

METHOD FOR EFFICIENTLY SIMULATING THE DYNAMIC BEHAVIOR OF A DATA COMMUNICATIONS NETWORK

BACKGROUND OF THE INVENTION

1. Technical Field

The invention disclosed broadly relates to data processing systems and methods and more particularly relates to a data processing method for the efficient simulation of a data communications network operating with a window-based protocol.

2. Background Information

Window protocols have been successfully used for multiple purposes in computer networks. Often, they are found at several network architecture layers. They provide a means for flow control and are at the heart of any network congestion control mechanism. Typical window protocols are found in IBM's System Network Architecture which is explained, for example, in the book by Anura Guruge, *SNA—Theory in Practice*, Pergamon Infotech Ltd., 1984. Another window protocol system can be found in DECnet which is described, for example, in the article by Raj K. Jain, "A Timeout Based Congestion Control Scheme for Window Flow Controlled Networks," *IEEE Journal on Selected Areas in Communications*, Vol. SAC-4, No. 7, October 1986. Window protocols allow control of the amount of data in transit between two users of the protocol. As a flow control mechanism they prevent a fast sender from overwhelming a slow receiver. The prior art approach to the analysis of window protocols has been limited to queuing theory or by simulation. Formal queuing theory is used in the analysis of computer network behavior. An example of this is described by Leonard Kleinrock, "Queuing Systems," Vol. 2, *Computer Applications*, New York: Wiley - Interscience, 1976.

Since queuing theory analysis has problems characterizing the dynamic behavior of a network, simulation methods have been applied. Typically, simulations are performed to validate analytic models or investigate the operational details of a specific mechanism. However, considerable effort is involved in building and running any simulator. The use of a benchmark that specifies system topology, hardware behavior and trial workloads requires development. Frequently, shortcuts are taken at the expense of accuracy. Validation of a simulation model and the proper choice of a benchmark to evaluate window protocol behavior appear to be open problems.

OBJECTS OF THE INVENTION

It is therefore an object of the invention to provide a method to more efficiently simulate a window-based protocol for a data communications network.

It is another object of the invention to provide an improved method for optimizing a data communications network employing a window-based protocol.

SUMMARY OF THE INVENTION

These and other objects, features and advantages are accomplished by the method disclosed herein. The invention is a method for the efficient simulation of the dynamic behavior of a data communications network running under a window-based protocol. The typical data communications network includes a sending node which sends a first window's worth of data packets during a first cycle on a first communications link in the network to an intermediate node having a queue. The queue outputs data packets at a departure rate on a second communications link in the network to a destination node and the intermediate node further outs queue size information during the first cycle to the sending node. The destination node sends a marker to the sending node indicating the receipt of data packets from the first window's worth of data packets. The sending node then sends a second window's worth of data packets during a second cycle in response to having received the marker, the second window's worth of data packets having a size controlled by the queue size information.

The inventive method efficiently simulates the dynamic behavior of the communications network. The method includes the step of computing in a data processor a first queue size information during the first cycle, from the size of the first window's worth of data packets and the departure rate of the queue. Then the method compares in the data processor the first queue size information with a threshold queue size value. It then computes in the data processor the size of the second window's worth of data packets, from the size of the first window's worth and the result of the comparing step. Then the method computes a first cycle time duration of the first cycle necessary to transmit a data packet in the first window's worth of data packets from the sending node to the destination node and to transmit the marker from the destination node to the sending node. At the end of the first stage, the method stores the size of the first window's worth of data packets and the first cycle time in a table in the data processor.

In the second stage, the method computes in the data processor a second queue size information during the second cycle, from the size of the second window's worth of data packets and the departure rate of the queue. Then it compares in the data processor the second queue size information with the threshold queue size value. The method then computes in the data processor the size of the next window's worth of data packets, from the size of the second window's worth and the result of the comparing step for the second cycle. Then the method computes a second cycle time duration of the second cycle necessary to transmit a data packet in the second window's worth of data packets from the sending node to the destination node and to transmit the marker from the destination node to the sending node. Then the method stores the size of the second window's worth of data packets and the second cycle time in the table in the data processor.

Finally, the method determines in the data processor from the table a period for a repetitive pattern of the cycle times and the window sizes, and from this, the method computes a throughput value for the network from the cycle times in the period.

DESCRIPTION OF THE BEST MODE FOR CARRYING OUT THE INVENTION

Figure 1A:
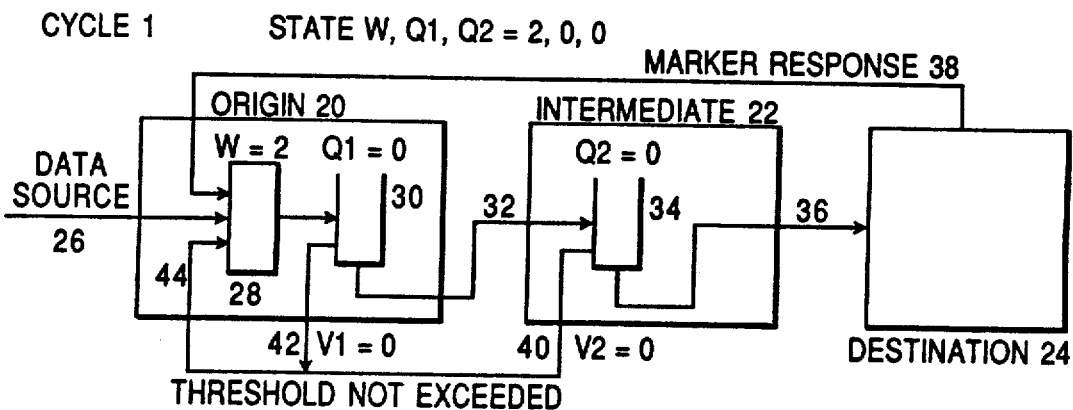
FIGS. 1A-1M show a sequence of schematic diagrams of a data communications network operating under a window-based protocol, as it achieves a periodic repetition of the dynamic behavior for the system.

A window-based protocol for a data communications network is modeled by the disclosed method. The method attributes physical and logical parameters to the components in the communications network. This includes an initial window size for the input terminal in the communications network. The initial window size will dynamically change over time as information packets are propagated through the network and control signals are fed back in accordance with the window protocol. A first cycle for exercising the model consists of transmitting from the input station, the first window of data. The second cycle consists of inputting the next window of data. Consecutive cycles consist of inputting consecutive windows of data. At the end of each cycle a state characterization is inferred for the network. The network consists of a series connected array of queues. Each queue has been specified by the user as having a given threshold size and a given maximum rate of data transmission. As the network passes data through consecutive cycles, several of the queues begin filling with data that could not be passed during the current cycle. When a given queue in the network reaches a threshold level of accumulated data, it will feed back a control signal to the beginning or input node, signaling that the window size for inputting data during a next cycle should be reduced. The number of bytes accumulated in each of the queues in the network represents the state of the network during a particular cycle. In accordance with the invention, the states of the consecutive cycles are monitored and an attempt is made to recognize a repetitive pattern for those consecutive states. When a repetitive pattern for the occurrence of the states in the network is identified, the data throughput for a period of state repetition is characterized and extrapolated to find the total amount of time necessary to transfer the remaining bytes of data necessary to achieve a predetermined total byte transmission. It is the characterization of the period for the repetitive pattern of cyclic states and the extrapolation based upon the identification of the repetitive pattern of states for the window-based protocol network, which is the heart of the invention.

Each window's worth of data which is input at the input node includes a marker. When that marker reaches the destination node at the end of the serial network, that marker is fed back to the input node. When that feedback is received by the input node, a decision is made as to whether the window size is to be changed for the next window's worth of data to be input. The window size will be increased unless a signal is received from any of the nodes in the network indicating that its queue has reached a threshold of accumulated messages. When a queue threshold signal is received at the input node, a decision is made as to whether that is adequate to not increase the window size or alternately to decrease the window size for the next window's worth of data to be input. Over the course of consecutive cycles, the state of accumulated messages in each of the queues oscillates and the window size at the input node oscillates. After sufficient time has elapsed, a periodic pattern of filled queues and window sizes will occur and this is the repetitive pattern of states which is to be identified, in accordance with the invention.

FIGS. 1A-1M illustrate a data communications network operating under a window-based protocol, illustrating the sequential cycles in its operation. The data communications network was represented by an origin node 20, an intermediate node 22, and a destination node 24. A data source 26 supplies a sufficient quantity of data packets to the origin node 20.

The origin node 20 includes the window generator 28 which receives data packets from the data source 26 and which outputs a window's worth of data packets to the queue 30. The queue 30 has a characteristic departure rate for outputting data packets over communications link 32 to the intermediate node 22. The intermediate node 22 includes the queue 34 which receives the data packets from the link 32. The queue 34 has another departure rate which characterizes it, which is the rate at which packets are output from the queue 34 onto the communications link 36 to the destination node 24.

When the destination node 24 receives a data packet from a window's worth of data packets, it outputs a marker response over line 38 to the window 28 in the origin node 20. In response to the receipt of the marker response on line 38, the window 28 will output a second window's worth of data packets to the queue 30.

The queue 30 has a threshold value assigned to it for the maximum number of packets which can be stored in the queue, above which a threshold congestion signal V1 is output to the window 28. Similarly, the queue 34 has a second threshold value assigned to it for the maximum number of data packets which can accumulate in the queue 34, above which a threshold congestion signal V2 will be output from queue 34 to the window 28. The input 44 to the window 28 supplies the threshold congestion signals V1 and V2 from the queues 30 and 34, respectively, to the window 28.

When the window 28 receives a threshold congestion signal on the line 44, the next window's worth of data packets will have a reduced size from the current window's worth of data packets, in order to reduce the number of data packets which are output during the next cycle to the queue 30.

A cycle is defined as the duration of time between the receipt of a first marker response on line 38 and the receipt of a second marker response on line 38 at the window 28.

Each cycle of the data communications network can be characterized by a state with the parameters of that state including the cycle time duration from the receipt of a first marker response 38 to the receipt of a second marker response 38 at the window 28. Other parameters defining a state can include the window size during a cycle, the maximum number of packets stored at any instant in the first queue 30 or in the second queue 34.

As the cycles of operation progress for the data communications network, the states for each respective cycle will form a pattern which will ultimately become repetitive. The repetition period for the pattern of states is significant since for the transmission of large blocks of data over an extended interval of time, a plurality of consecutive periods of repetitive patterns will occur.

In accordance with the invention, by characterizing a single period of a repetitive pattern of states for the dynamic behavior of the data communications network operating under the window-based protocol, the overall throughput and other performance characteristics for the data processing system can be determined. From an analysis of the resulting computed throughput for the data processing system, changes can be made to various operating parameters such as the departure rate for the queues, the incremental change in window sizes as congestion thresholds are reached, and other system parameters, one can optimize the throughput or other performance characteristics for a data communications network.

FIGS. 1A-1M show a sequence of schematic diagrams of a data communications network operating under a window-based protocol, as it achieves a periodic repetition of the dynamic behavior for the system. FIG. 1A shows cycle 1 which is characterized by the state of variables for the window size W, the maximum size obtained by the queue 30, which is Q1 and the maximum size achieved by the second queue 34, which is Q2. In FIG. 1A, cycle 1 has the state of W=2, Q1=0 and Q2=0.

Figure 1B:
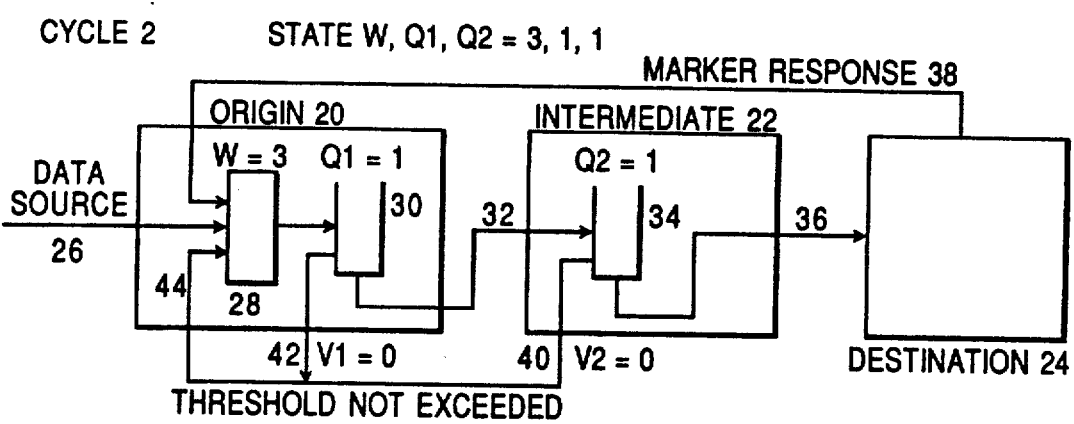

In FIG. 1B, cycle 2 for the network starts when the marker associated with the window's worth of packets transmitted during cycle 1 of FIG. 1A, is received back on line 38 at the origin node 20. Since the threshold's value V1 for the first queue 30 was not achieved, V1 is equal to zero and since the threshold value for the second queue 34, was not achieved, V2 is equal to zero. The threshold conditions V1 and V2 are fed back on line 44 to the window generator 28 of the origin node 20, along with the marker response on line 38. Since V1 equals 0 and V2 equals 0 for cycle 1, the window size for the window generator is incremented, in this example by one data packet size. Thus it is seen that in FIG. 1B for cycle 2, the value of W is 3. In cycle 2, packets from both the first window's worth of data and the second window's worth of data bring the maximum queue size of the first queue 30 up to one packet and also brings the maximum queue size of the second window 35 up to one packet. Thus, the state for cycle 2 is W=3, Q1=1 and Q2=1.

Figure 1C:
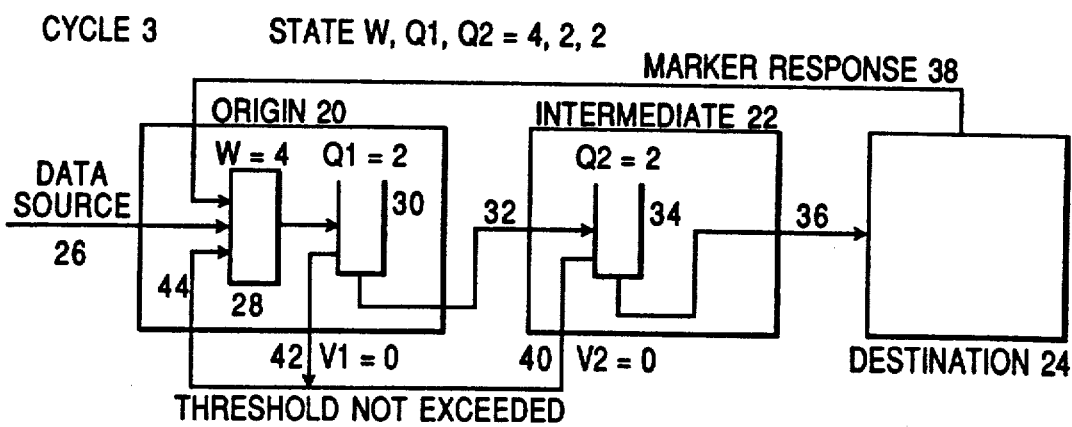
Figure 1D:
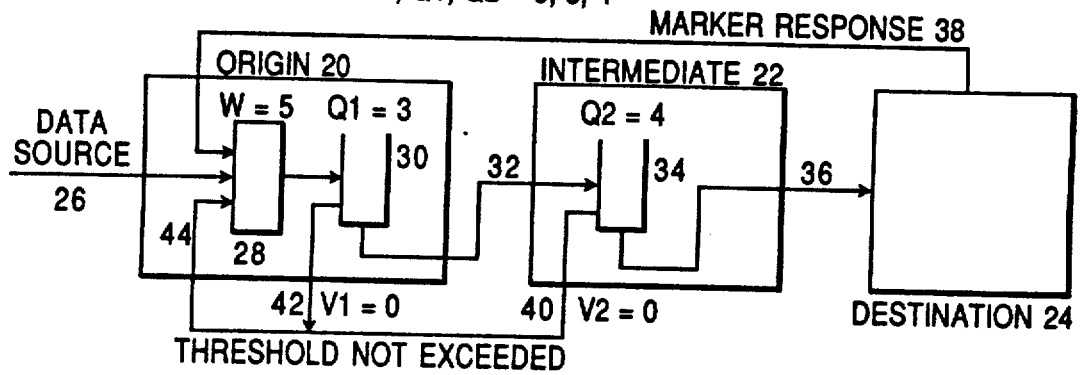

When the marker is received at the window generator 28 of the line 38 for the second cycle, this initiates cycle 3 in FIG. 1C. Since the threshold was not achieved for the first queue 30 in the second cycle, V1 equals 0 and since the threshold is not achieved for the second queue 34, V2 equals 0 in the second cycle. Thus, the window generator in cycle 3 adjusts the window size to four packets and W equals 4. During the third cycle in FIG. 1C, the maximum accumulation of packets in the first queue 30 is two packets, so Q1 equals 2 and the maximum accumulation of packets in the second queue 34 is two packets, so Q2 equals 2. Since the threshold value for both the queue 30 and queue 34 has been set equal to 6, neither queue 30 nor queue 34 achieve the threshold. Therefore, during cycle 3, the V1 equals 0 and V2 equals 0. The state for cycle 3 is W=4, Q1=2 and Q2=2.

In FIG. 1B, cycle 4 has the window generator receiving the marker on line 38 and receiving values of V1 equals 0 and V2 equals 2 on line 44 and therefore the window generator 28 will increment the window size by one so that W equals 5. During the interval of cycle 4, three packets accumulate in the first queue 30 and therefore Q1 equals 3 and four packets accumulate in the second queue 34 and thus Q2 equals 4. The state for cycle 4 is W=5, Q1=3 and Q2=4.

Figure 1E:
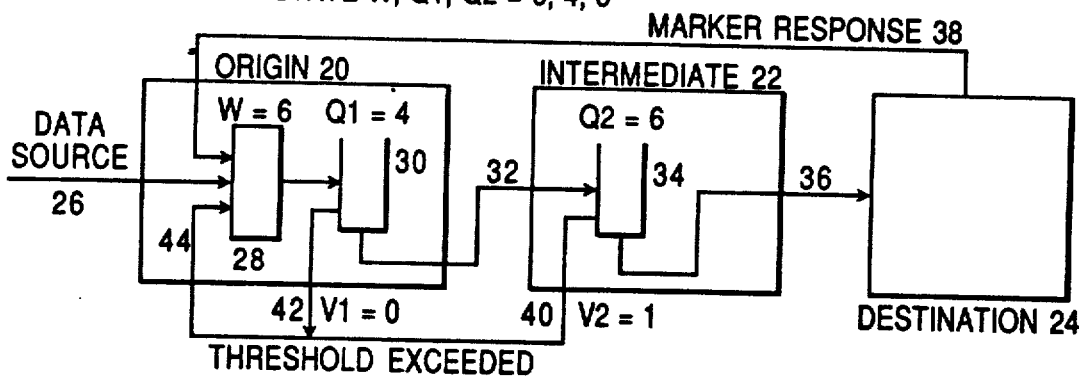
Figure 1F:
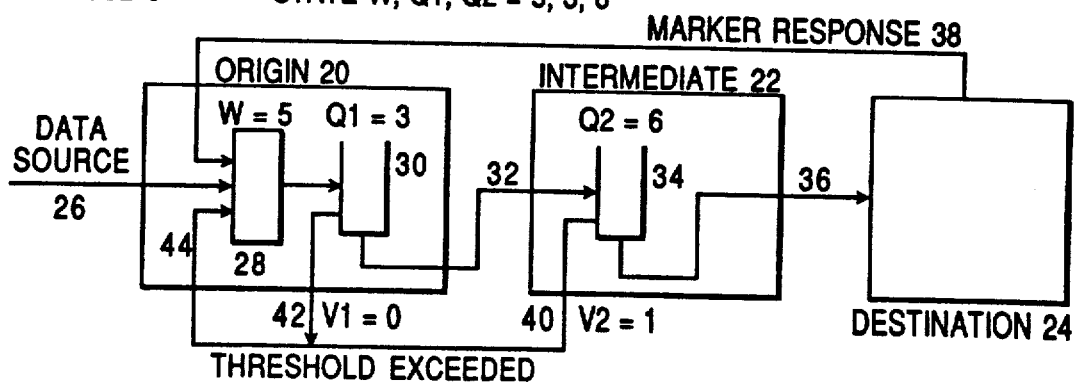

FIG. 1E shows cycle 5 in which a marker is received on line 38 initiating cycle 5 and values of V1 equals 0 and V2 equals 0 are received from queue 30 and queue 34 during the previous cycle 4 on line 44. Thus, the window generator 28 during cycle 5 increments the window size by one, resulting in W equals 6 for cycle 5. During the interval of cycle 5, four packets accumulate in the first queue 30 making Q1 equals 4 and six packets accumulate in the second queue 34 making Q2 equal 6. During cycle 5, since only four packets have accumulated in the first queue 30, V1 equals 0. However, during cycle 5, since six packets have accumulated in the second queue 34, this being the threshold value for second queue, V2 is equal to 1. The state for cycle 5 is W=6, Q1=4 and Q2=6.

At the beginning of cycle 6, the marker is received over the line 38 at the window generator 28 and the value V1 equals 0 and the value V2 equals 1 are received over line 44. Since the value V2 equals 1, the threshold has been reached for one of its queues in the communications link between the origin 20 and the destination 24. In accordance with the window-based protocol, the window generator 28 will not increment the size of the window for cycle 6, but will decrement the current window size from the value of W equals 6 to a new value of W equals 5 for cycle 6. During cycle 6, three packets accumulate in the first queue 30 since Q1 equals 3 and six packets have accumulated in the second queue 34 so Q2 equals 6. Since the threshold has not been reached for the first queue 30, V1 equals 0. However, since the threshold has been reached for the second queue 34, V2 equals 1. The state for cycle 6 is W=5, Q1=3 and Q2=6.

Figure 1G:
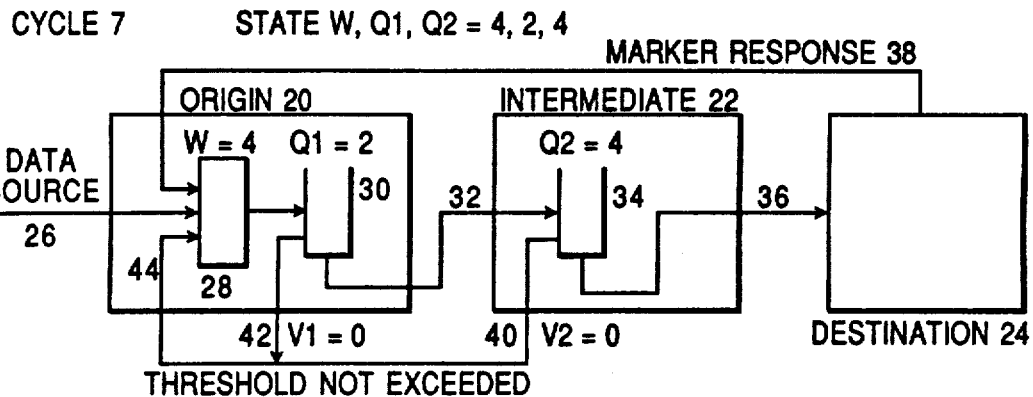
Figure 1H:
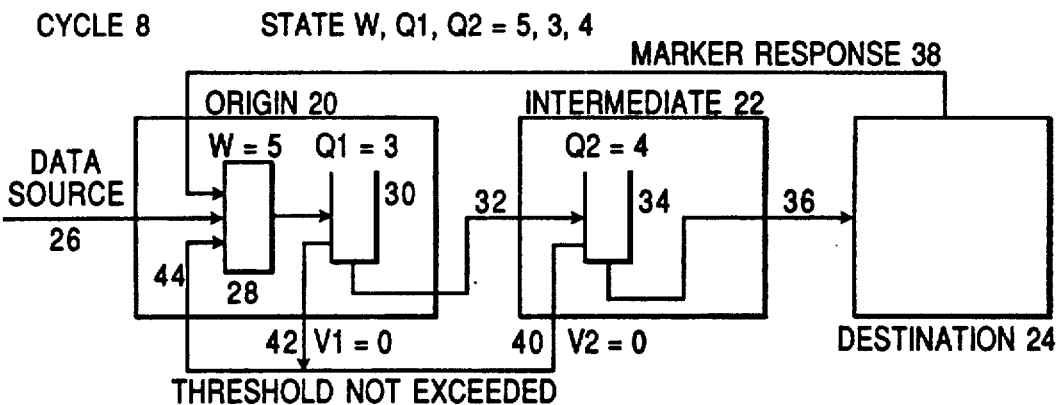

In FIG. 1G, cycle 7 begins with the receipt of the marker on line 38 at the window generator 28. The value V1 equals 0 and the value V2 equals 1, are received from the state of the preceding cycle 6 and are applied on line 44 to the window generator 28. This will cause the window generator 28 during cycle 7 to decrement the size of the window from the existing cycle 5 which occurred in cycle 6 to a new size W equals 4 which will obtain during cycle 7. During cycle 7, two packets accumulate in the first queue 30 so Q1 equals 2 and four packets accumulate in the second queue 34 and thus Q2 will equal 4. Since the threshold is not exceeded for a first queue 30 or the second queue 34 during cycle 7, both V1 and V2 will equal 0. The state for cycle 7 is thus W=4, Q1=2 and Q2=4.

Cycle 8 begins with the receipt of the marker on line 38 at the window generator 28. The values of V1 equals 0 and V2 equals 0 which obtained during cycle 7 are applied on line 44 to the window generator 28 at the beginning of cycle 8. Since both V1 and V2 equal 0, the window-based protocol will increment the current window size W equals 4 to a new window size W equals 5 for cycle 8. During cycle 8, three packets accumulate in the first queue 30 and therefore Q1 equals 3 and four packets accumulate in the second queue 34 and therefore Q2 equals 4. Since the threshold is not exceeded for either the first or the second queues, V1 and V2 are both 0 during cycle 8. The state for cycle 8 is W=5, Q1=3 and Q2=4.

Figure 1I:
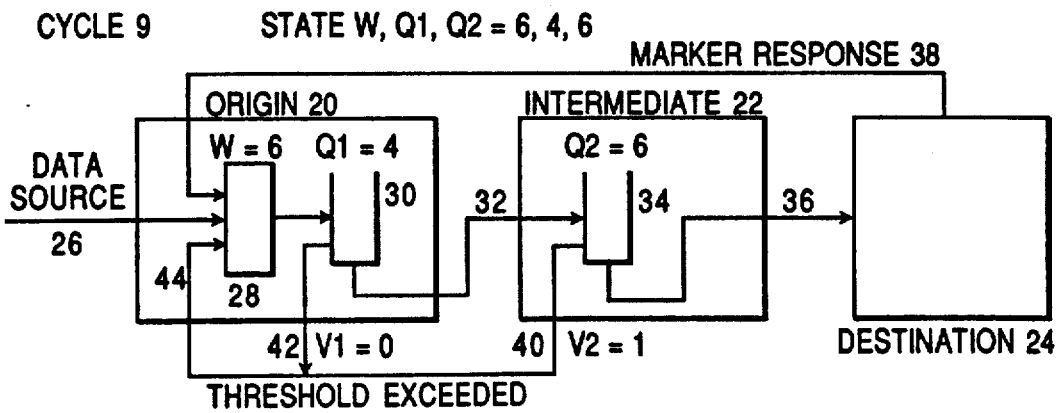

In FIG. 1I, cycle 9 begins with the receipt of the marker on line 38 at the window generator 28. The values for V1 and V2 which were generated during cycle 8 are applied over line 44 to the window generator 28 and both values are 0. Therefore, the window-based protocol increments the window size from the value W equals 5 which obtained in cycle 8, to a new value W equals 6 which will apply during cycle 9. During cycle 9, four packets accumulate in the first queue 30 and therefore Q1 equals 4. However, six packets accumulate in the second queue 34 making Q2 equal 6, which exceeds the threshold for the second queue. Thus, V1 will equal 0 and V2 will equal 1 during cycle 9. The state for cycle 9 is W=6, Q1=4 and Q2=6.

Figure 1J:
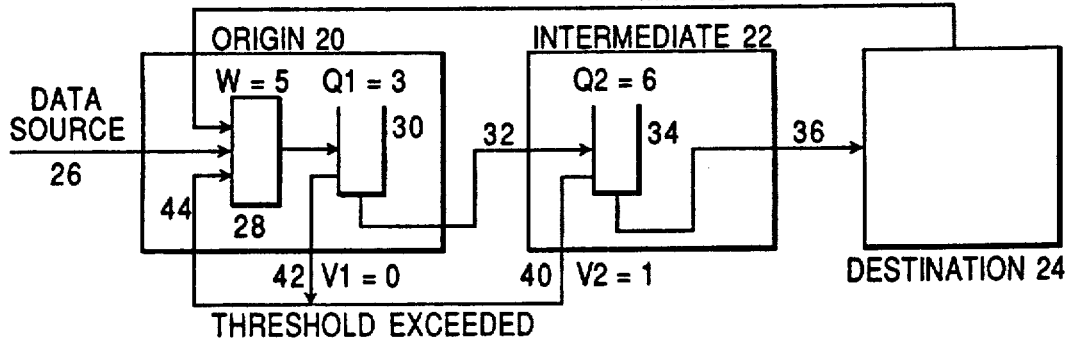

In FIG. 1J, cycle 10 begins with the receipt of the marker on line 38 of the window generator 28. Since the value of V1 equals 0 and V2 equals 1 during the preceding cycle 9, these values applied on line 44 to the window generator 28 at the beginning of cycle 10 will cause the window generator to decrement the window size by one packet from the value of W equals six which obtained during cycle 9, to a new value of W equals 5 which will obtain during cycle 10. During cycle 10, three packets will accumulate in the first queue 30 and therefore Q1 equals 3 and six packets will have accumulated in the second queue 34 and therefore Q2 equals six, which exceeds the threshold value. Thus, V1 equals 0 and V2 equals 1 during cycle 10. The state for cycle 10 is W=5, Q1=3 and Q2=6.

Figure 1K:
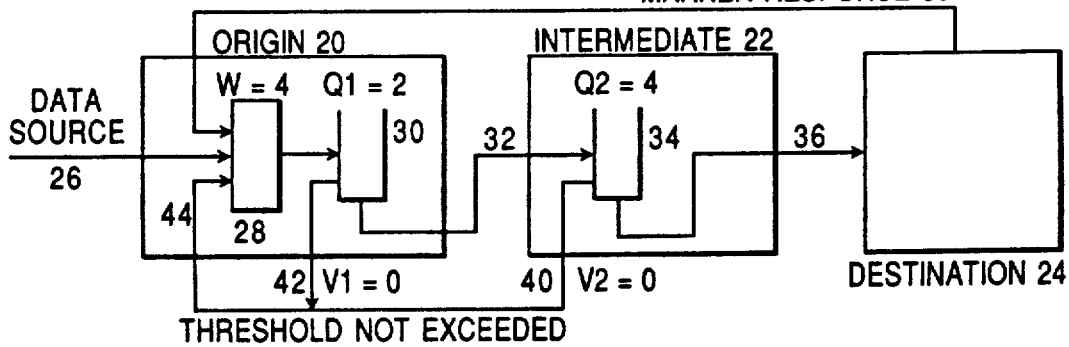

In FIG. 1K, cycle 11 begins with the receipt of the marker on line 38 of the window generator 28. The value of V1 equals 0 and V2 equals 1 which obtained during cycle 10, are applied over line 44 to the window generator 28 at the beginning of cycle 11. This causes the window-based protocol to reduce the window size from the preceding value W equals 5 which obtained during cycle 10, to a new value of W equals 4 which will obtain during cycle 11. During cycle 11, the two packets will accumulate in queue 30, making Q1 equal 2 and four packets will accumulate in queue 34, making Q2 equal 4. Since neither queue exceeds its threshold value of 6, V1 equals 0 and V2 equals 0 during cycle 11. The state for cycle 11 is W=4, Q1=2 and Q2=4.

Figure 1L:
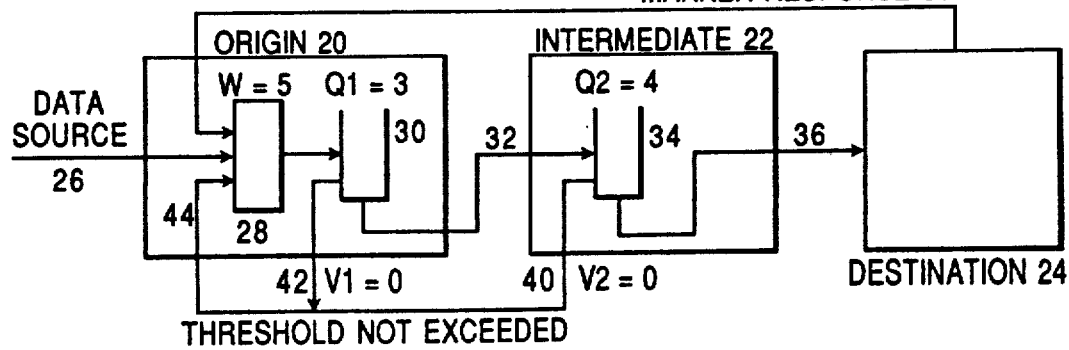

In FIG. 1L, cycle 12 begins with the receipt of the marker on line 38 at the window generator 28. The values of V1 equals 0 and V2 equals 0 which were generated during cycle 11, are applied to the window generator 28 of the line 44 at the beginning of cycle 12. Since both V1 equals 0 and V2 equals 0, the window-based protocol will increment the size of the window from the value W equals 4 which obtained during cycle 11, to a value of W equals 5 which will obtain during cycle 12. During cycle 12, three packets accumulate in the queue 30 making Q1 equal to 3 and four packets accumulate in the second queue 34 making Q2 equal 4. Since neither queue has reached its threshold, V1 equals 0 and V2 equals 0 during cycle 12. The state for cycle 12 is W=5, Q1=3 and Q2=4.

Figures 1M, 2:
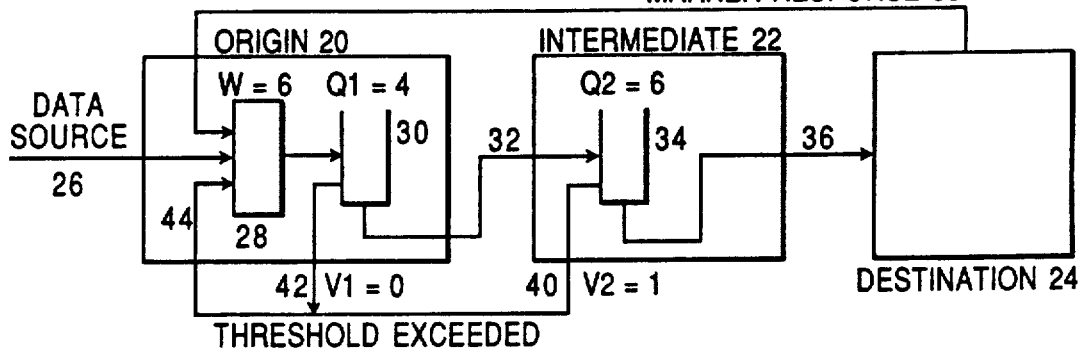
FIG. 2 is a table which summarizes the consecutive states of the data communications network of FIGS. 1A-1M.

FIG. 1M shows cycle 13 which begins with the receipt of the marker on line 38 at the window generator 28. The values of V1 equals 0 and V2 equals 0 which were generated in cycle 12, are applied on line 44 to the window generator 28 at the beginning of cycle 13. Since V1 equals 0 and V2 equals 0, the window-based protocol will increment the size of the window from the value W equals 5 which obtained during cycle 12, to a value W equals 6 which will obtain during cycle 13. During cycle 13, four packets accumulate in the first queue 30 making Q1 equal to 4 and six packets accumulate in the second queue 34 making Q2 equal to 6, which exceeds its threshold value. Therefore, V1 equals 0 and V2 equals 1 during cycle 13. The state for cycle 13 is W=6, Q1=4 and Q2=6.

The states for the cycles 1-13 are recorded in the cycle state table shown in FIG. 2. It can be seen that a pattern of periodic repetition of the states occurs every four cycles, starting with cycle 4, the pattern repeating again at cycle 8 and at cycle 12. In accordance with the invention, by characterizing a single period of a repetitive pattern of states for the dynamic behavior of a data communications network, the behavior of subsequent cycles can be inferred. By determining from the cyclic state table a period for repetitive pattern cycle times and window sizes, the throughput and other performance characteristics for the network can be predictive. In the example shown in FIGS. 1A-1M and FIG. 2, beginning with cycle 12, the method of the invention will extrapolate for another 57 periods of four cycles each to determine the overall duration necessary to transmit a total of 10,000 packets. After having computed this duration for 10,000 packets, the throughput for the network can be determined as the ratio of packets per unit time. In addition, response times and other performance characteristics for the transmission of 10,000 packets can be quickly determined.

The invention is a method for the efficient prediction of the dynamic behavior of a data communications network running under a window-based protocol. The typical data communications network includes a sending node which sends a first window's worth of data packets during a first cycle on a first communications link in the network to an intermediate node having a queue. The queue outputs data packets at a departure rate on a second communications link in the network to a destination node, and the intermediate node further outputs queue size information during the first cycle to the sending node. The destination node sends a marker to the sending node indicating the receipt of data packets from the first window's worth of data packets. The sending node then sends a second window's worth of data packets during a second cycle in response to having received the marker, the second window's worth of data packets having a size controlled by the queue size information.

The inventive method efficiently predicts the dynamic behavior of the communications network. The method includes the step of computing in a data processor a first queue size information during the first cycle, from the size of the first window's worth of data packets and the departure rate of the queue. Then the method compares in the data processor the first queue size information with a threshold queue size value. It then computes in the data processor the size of the second window's worth of data packets, from the size of the first window's worth and the result of the comparing step. Then the method computes a first cycle time duration of the first cycle necessary to transmit a data packet in the first window's worth of data packets from the sending node to the destination node and to transmit the marker from the destination node to the sending node. At the end of the first stage, the method stores the size of the first window's worth of data packets and the first cycle time in a table in the data processor.

In the second stage, the method computes in the data processor a second queue size information during the second cycle, from the size of the second window's worth of data packets and the departure rate of the queue. Then it compares in the data processor the second queue size information with the threshold queue size value. The method then computes in the data processor the size of the next window's worth of data packets, from the size of the second window's worth and the result of the comparing step for the second cycle. Then the method computes a second cycle time duration of the second cycle necessary to transmit a data packet in the second window's worth of data packets from the sending node to the destination node and to transmit the marker from the destination node to the sending node. Then the method stores the size of the second window's worth of data packets and the second cycle time in the table in the data processor.

Finally, the method determines in the data processor from the table a period for a repetitive pattern of the cycle times and the window sizes, and from this, the method computes a throughput value and other performance characteristics for the network from the cycle times in the period.

In this manner, the performance of the data communications network operating under a window-based protocol can be efficiently predicted and modifications can then be quickly made to the parameters controlling network behavior, to optimize the performance of the network.

Figure 3:
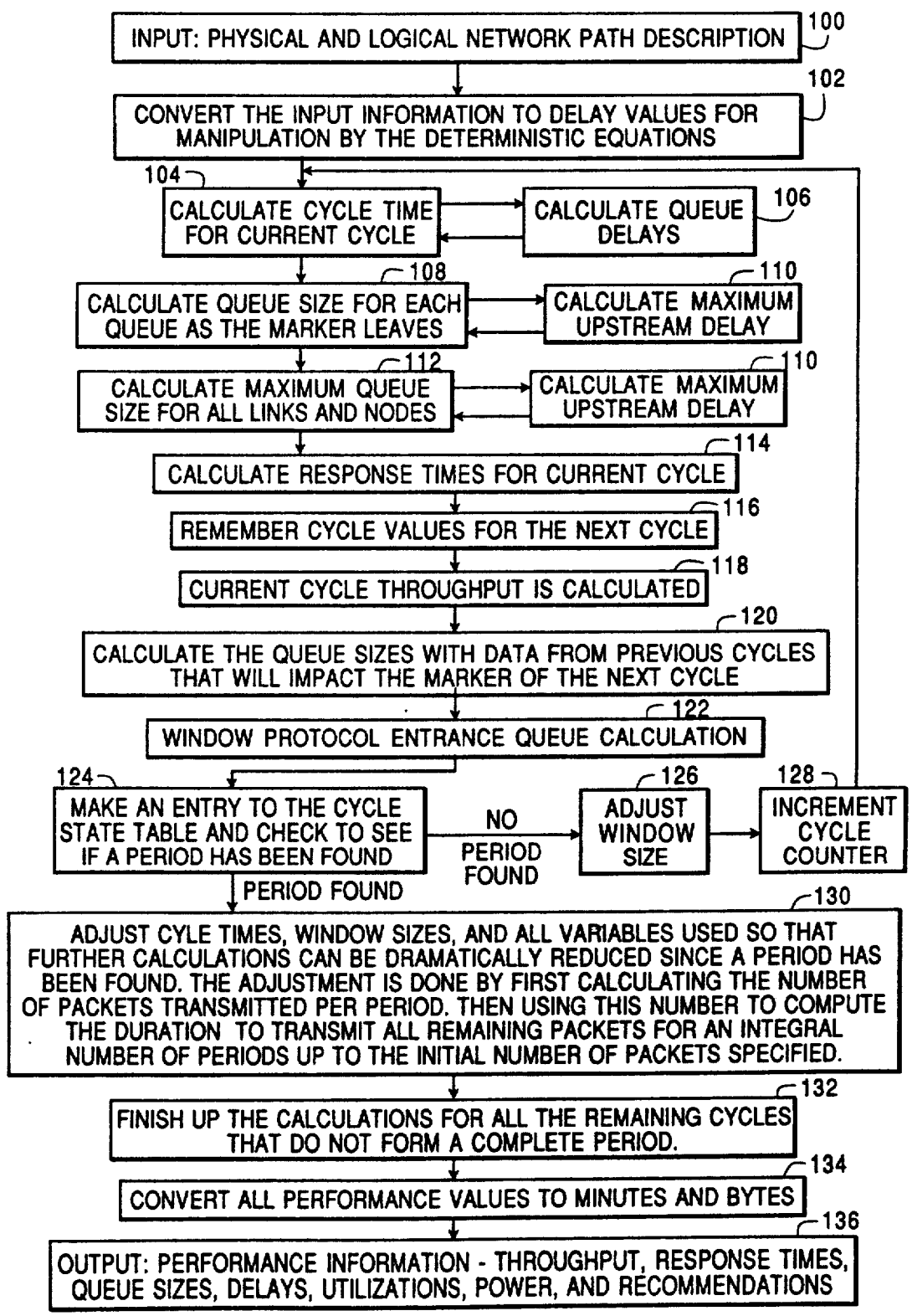
FIG. 3 is a flow diagram of the invention.

FIG. 3 is a flow diagram of the invention. The flow diagram for the method is shown in FIG. 3 and starts with step 100 in which a physical and logical network path description is input. This information includes the initial window size for the window generator 28, the threshold size for the first queue 30 and for the second queue 34, and the departure rate for packets output from the first queue 30 and the second queue 34.

The method then continues with step 102 in which the input information is converted to delay values from deterministic equations. The flow diagram of FIG. 3 describes in outline form, the pseudo code program instructions shown in Table 1 which implement the method of the invention.

The flow diagram of FIG. 3 then proceeds to step 104 which calculates the cycle time from the current cycle. Then the subroutine is called in step 106 to calculate queue delays. Then step 104 proceeds to step 108 to calculate the queue size for each queue as the marker leaves that queue. The subroutine 110 is then called to calculate the maximum upstream delay. Reference should be made to the pseudo code program instructions in Table 1 for a further explanation of these steps.

Step 112 proceeds to step 114 which calculates response times for the current cycle. Then the method proceeds to step 116 to remember the cycle values for the next cycle. The method proceeds to step 118 where the current cycle throughput is calculated. Then the method proceeds to 120 to calculate the queue sizes with data from the previous cycles that will impact the marker of the next cycle. Then the method proceeds to step 122 in which the window protocol entrance queue is calculated. This is the adjustment of the window size in preparation for the next cycle, based upon whether any of the queues have achieved their threshold value in the current cycle.

Step 122 then proceeds to step 124 which makes an entry into the cycle state table and which checks to see if a periodic pattern of cycle states has been found. If no periodic pattern of cycle states has been found, then step 124 proceeds to step 126 where the window size is adjusted in preparation for the next cycle, in accordance with the window-based protocol and the values of V1 and V2. Step 126 then proceeds to step 128 which increments the cycle counter and then the method returns to the beginning of step 104 to begin the calculation for the next cycle.

If step 124 finds a periodic pattern for the repetition of states for the cycles, then step 124 proceeds to step 130 to extrapolate for the remaining number of periods necessary to transmit a total of 10,000 packets through the network. The duration found for a period of the repetitive pattern of cycles is multiplied times the number of periods necessary to complete the transmission of a desired number of packets, for example approximately 10,000 packets. Then step 130 proceeds to step 132 where, if there remain a few packets at the end of the integral number of periods extrapolated, the remaining cycles are calculated in order to complete the full 10,000 packet quantity. The duration necessary to complete the remaining cycles is computed.

Then step 132 proceeds to step 134 where the overall duration to transmit 10,000 packets is divided into the quantity of 10,000 packets in order to compute the throughput for the network under evaluation. Other performance characteristics can also be computed for the transmission of 10,000 packets, including response times, queue sizes, delays, utilizations, power and other performance characteristics. Then the method proceeds to step 136 where these computed values are output for use by the user in characterizing the network. Recommendations are usually made for the adjustment of network parameters such as queue thresholds, departure rates, incremental window sizes, and other parameters, to improve performance characteristics such as throughput, response times, and other factors. Step 136 displays to the user all of the performance information that he needs plus the method makes recommendations of how he can change network parameters or physical characteristics to improve network performance. The user then has the option to repeat the method, starting the process at step 100, using the output information that he has been provided from the first execution of the method invention. At this point, the user can change any network parameters that are desired, take the recommendations offered by the method, or disregard them. The user for example, might want to change the arrival rate because he thinks that application processing will change for some reason. Or he anticipates installing a new node in the network and the resulting arrival rate will increase, but installation will not happen for a couple of weeks. The user has the ability to specifically consider "what if" trials by feeding trial information to the model and observing the results. He can invoke the model a second, third or as many times as is required, to observe cause and effect relationships for a network's performance. When the "what if" trials are completed, the user can go implement an actual running network, using the recommendations offered in the output of the method. The performance improvements of the real network will be substantially the same as the improvements the model has predicted. Reference should be made to the pseudo code for the program instructions in Table 1, for a further explanation of the various steps in the flow diagram of FIG. 3.

The state concept that is employed in the inventive method can easily be extended to any arbitrary depth, for example the state can consist of the sizes of a window and a queue, the sizes of a window and two queues, the sizes of a window and as many queues or cycles needed in a state to identify the periodic pattern of a cyclic process occurring within the network model. For example, a very powerful extension of the model is to include an up front queue which reflects the pattern of arrivals to data source 26 shown in FIG. 1a. If the pattern of arrival is a steady constant stream, this behavior would be representative of traffic originating from another computer or an application program which provides large volumes of data and does not have any response time considerations. If the traffic is arriving from a data source consisting of a population of users at interactive terminals, then the pattern of data will change at the source because the data arrives at irregular peaks and its transmission through the network, coming in at 26, going through the different queues at 30 and at 34 and finally arriving at the destination, will have an impact on the ability of the population to supply data. In other words, as someone hits an enter key at an interactive terminal, they are prevented from hitting any additional enter keys until some data returns from the network. The performance of the path will actually impact the user's ability to transmit data, which will control the performance observed in the network. We will see that as the queues Q1 and Q2, the window sizes and the cycle sizes change, they will have an impact on the arrival pattern from the user population to the data source. This can be included in the model and we can look for cycles that represent the type of data source. If there is interactive traffic, then the model can be easily extended to represent different types of network traffic and therefore give much better recommendations based on the traffic behavior observed. The traffic behavior observed is represented by the fluctuations at the data source queue.

TABLE 1

```
100:
Throughout this code "REQUEST" and "RESPONSE" refer to the either of
the two directions the "MARKER" can travel through a network path.
```

```
CONST zero = 0, one = 1, true = -1, false = zero, yes = -1, no = zero, none =
zero 'Dimension input arrays DIM sa$(8), tg$(8), sd!(8), cd!(8), num.lks(8), tg.spd!(8), lk.spd!(8), tg.dst
!(8)
DIM th.pri!(8), th...............
DIM ...............
```

```
Read variables from input screen: Link speeds, rates, thresholds, .. etc.

IF COMMAND$ = "..............
ON ERROR GOTO restart
OPEN "I"
INPUT #1, vr$
INPUT #1, arr.rate!                  '       arr.rate!
INPUT #1, num.pius!                  '       num.pius!

etc.
```

```
        Work Array Definitions

DIM d!(9)              'Link delay TIME array forward direction
DIM r!(9)              'Link delay TIME array reverse direction
DIM wait.ch!(9)        'Channel wait delay TIME array
DIM req.wait.ch!(9)    'Request channel wait array
DIM resp.wait.ch!(9)   'Response channel wait array
DIM qpa!!(9)           'Queue SIZE the REQ sees as it arrives at LINK etc.
```

```
102:    Initialization Subroutines

GOSUB Var.init          'Variable initialization subroutine
GOSUB Config.value      'Fixed configuration values subroutine Set window size variable to the proper initial value
Find bottlencek resource index value
indx = 1                'Index to begin cycle search for cyc det rtn
```

```
---------- *BEGIN*     MAIN ROUTINE    (repeated for each cycle) ----------
begin.main:

GOSUB Req.que.time:

tot.w! = Sum up all windows for util computation
```

```
104: Cycle time for the current cycle is done first.
```

```
t! = Convert arrival rate to interarrival time
temp! = Arrival time for a complete window
c! = Network time till response arrives
IF c! < temp! THEN Cycle time is max of arrival or the network time
ww = is the cycle window size remembered from the previous cycle
Remember the maximum window size for each cycle
```

```
108: Calculate queue occupancy for the
current cycle when the MARKER leaves
the link queue. (MARKER = REQ)
```

```
FOR j = start TO linknum
  GOSUB Max.delay          'Find the largest upstream delay value in max!
  tqpl!(j) = time REQ is in the j-th queue
  qpl!(j) = INT(tqpl!(j))...... 'Queue size seen when the request leaves
NEXT j
```

```
112: Calculate maximum LINK queue occupancy "maxql"
```

```
FOR j = start TO linknum
  GOSUB Max.delay          'Find the largest upstream delay value in max!
  tmaxql!(j) = Time the last packet of the window arrives at the j-th queue
  maxql(j) = Maximum queue size calculation for link j is performed here
  w.maxql!(j) = response time calculation due to queue delays
  exact number of packets in front of REQUEST may need to be adjusted
  Remember largest queue size
NEXT j
```

```
112': Calculate maximum NODE queue occupancy "maxqs"
```

```
FOR j = start TO linknum
  GOSUB Max.delay          'Find the largest upstream delay value in max!
  tmaxqs!(j) = Time the last packet of the window arrives at the j-th queue
  maxqs(j) = maximum queue size calculation for node j is performed here
  w.maxqs!(j) = response time calculation due to queue delays
  Maximum queue size can not be negative
  Remember largest queue size
NEXT j
```

```
114: Calculate the response time for the
the first and last (W-th) packet of the
window to make it's way through the VC
```

```
first.rsp!(i) = First packet response time
w.rsp!(i) = Get fixed round trip delay and adjust it.
FOR j = start TO linknum
  w.rsp!(i) = w.rsp!(i) + (w.maxql!(j) * .....)   'Add in link que delays last
NEXT j                                            ' packet in the window sees
FOR j = start TO linknum
  w.rsp!(i) = w.rsp!(i) + (w.maxqs!(j) * ......)  'Add in node que delays last
NEXT j                                            ' packet in the window sees
```

```
116: Remember all necessary queue values for the next
cycle in the qpbl! and qpbs! arrays.
```

```
FOR temp = start TO linknum
  qpbl!(temp) = ...
NEXT temp
FOR temp = start TO
  qpbs!(temp) = ....
NEXT temp
```

```
118: Current cycle throughput and queues are calculated
```

```
tt! = Throughput time accumulation in seconds is calculated
bottleq!(i) = qpal!(botnk)  'Req Q size at slowest link calculated
```

```
If debug THEN GOSUB ...   'Detail information routines for debug purposes
                          '    and output verification
GOSUB Req.que.size        'packets found by REQ in each queue the next cycle
K! = K! - ww              'Packet count changed by the number sent.
GOSUB Vc.ent.que          'System entrance queue size computed
If cld = 1 THEN GOSUB Loop.det    'Check for FSM cycle
GOSUB window.comp         'Recompute window value "W" for the next cycle
```

```
'  128: Increment the cycle counter i = i + 1:                'cycle counter
IF K! < w THEN adjust w   'Are there enough packets left to fill out windc
IF K! = 0 THEN GOTO end.up 'When all packets are sent end the run
GOTO begin.main           'Start the next cycle
end.up:
PRINT #2, "Threshold= "; th.pri!(1); " then "; i; " Cycles needed to send ";
um.pius!; " Packets in time: "; tt!
  GOSUB Util.comp
```

```
'  134:  Adjust values to bytes and minutes tt! = convert TPUT seconds to minutes
FOR j = start TO linknum
   maxq.size!(j) = convert max queue size to bytes
NEXT j
THEN PRINT #2, " Thruput packet time in minutes: "; tt!
  GOSUB Rec.th.comp
stop.it:
  GOTO exit the program
```

```
'--------------------- * END *    MAIN ROUTINE  ---------------------
```

```
'  106: Pacing information Queue time delay subroutine.
'  Pacing delay due to link queue waits is added
'  to pacing delay due to node queue waits.
'  qdel! is the total delay seen by the pace info Req.que.time:
   initialize variables
   FOR temp = start TO linknum
      qdel! = qdel! + Link(temp) queue wait time
   NEXT temp
   FOR temp = start TO linknum
      qdel! = qdel! + Node(temp) queue wait time
   NEXT temp
   RETURN
```

```
'  120: Req.que.size subroutine finds the queue
'  size the MARKER sees as the MARKER
'  arrives at this queue in the next cycle.

Req.que.size:
   FOR temp = 1 TO linknum                    'Start with the first node
      initialize work variable vas!
      FOR j = start TO previous node
         vas! = vas! + previous cycle link upstream delays
      NEXT j
      FOR j = start TO previous node
         vas! = vas! + previous cycle node upstream delays
      NEXT j                                  ' for upstream delays
      vbs! = 0
      FOR j = start TO previous node
         vbs! = vbs! + same cycle upstream link queue delays
      NEXT j
      FOR j = start TO previous node
         vbs! = vbs! + same cycle upstream node delays
      NEXT j
      IF sd!(temp) = ..... THEN
         qpas!(temp) = constant
      ELSE
```

```
        qpas!(temp) = calc queue size seen by the pacing request
                      as it arrives at each node queue
      END IF
      Initialize work variable va!
      FOR j = start TO previous link
         va! = va! + previous cycle link upstream delays
      NEXT j
      FOR j = start TO previous link
         va! = va! + previous cycle node upstream delays
      NEXT j
      vb! = 0
      FOR j = start TO previous link
         vb! = vb! + same cycle upstream link queue delays
      NEXT j
      FOR j = start TO previous link
         vb! = vb! + same cycle upstream node queue delays
      NEXT j
      qpal!(temp) = calc queue size seen by the pacing request
                    as it arrives at each link queue
   NEXT temp
   qpas!(1) = 0                            'No node queueing delay in first node
   RETURN
```

```
  126:     Window.comp subroutine will adjust the window based on
           implied delayor detected congestion. For minor congestion the window
           is reduced by one. The window is modified for the next cycle. "w"
           is the window variable. The window size can only go as low as min.ws
           variable and as high as the max.ws variable.
```

```
window.comp:
   FOR j = start TO linknum                   'Check for congestion this cycle
      If congestion is detected then set switch = 1
   NEXT j
 - Check for congestion set in a previous cycle, if yes THEN set switch = 1
   IF proper conditions exist THEN
      raise window
   END IF
   IF switch = 1 THEN
      reduce window size if possible
      check to see if window has to be adjusted for end of run
      remember minimum window size seen
      switch = 0                              'Reset the congestion switch
   RETURN
```

```
  110:  Max.lk.delay subroutine finds the slowest
        link or node delay ending at the dl(j-1)
        link. The largest value represents the slowest
        resource (including arrival rate).
```

```
Max.delay:
   max! = slowest link delay or slowest node delay
   RETURN
```

```
  132:  Utilization value computation subroutine.
        Total bits sent / total transmission capacity
        Thruput time clock is stopped for each link
        until the first packet arrives for the link and
        after the last packet leaves that link.
```

```
Util.comp:
   bit.total! = use total bits transfered
   FOR temp = start TO linknum
      IF link is a channel THEN GOTO no.util.calc
      Initialize the work variables dftemp! and drtemp!
               with proper link time after last packet
               leaves and before first packet arrives
      Adjust for current SA delay if necessary
      ttt! = tt! - (time adjustment values)
      exp.util(temp) = (bit.total! / (tg.spd!(temp) * ttt!)) * 100
no.util.calc:
   NEXT temp
   RETURN
```

```
' ┌─────────────────────────────────────────────────────┐
' │ 136: Recommended threshold computation subroutine.  │
' │ Use the highest utilized link and maximum queue     │
' │ size for each link to compute the recommended       │
' │ transmission priority queue threshold value         │
' │ for each link.                                      │
' └─────────────────────────────────────────────────────┘
Rec.th.comp:
  Find highest utilized link
  IF proper conditions exist THEN
    FOR temp = 1 TO linknum
      IF link is a channel THEN GOTO no.th.calc
      compute recommended transmission priority
no.th.calc:
    NEXT temp
  END IG
  GOTO Print.out
  RETURN ' ┌─────────────────────────────────────────────────────┐
' │ 124: Entries are made into a cycle state table      │
' │ (which is a series of arrays) for each cycle.       │
' │ This cycle period detection subroutine then         │
' │ finds if the VC has entered a series of cycles      │
' │ that form a loop (a period). If a period            │
' │ is detected the analysis can be terminated          │
' │ because all the worse case performance and          │
' │ values have been detected.                          │
' └─────────────────────────────────────────────────────┘
Loop.det:
  w(i) = ....                          'set i-th window value and
  cl(i) = .....                        ' cycle time in the array.
  do not use initial cycles
  IF cswitch > 0 THEN GOTO keep.check  'if > 0 then working on cycle.
check1:                                'look for first FSM potential
  FOR r = indx TO (previous cycle      ' cycle state.
    IF cl(i) <> cl(r) THEN GOTO keep.going  'If cycle time and window size
    IF w(i) <> w(r) THEN GOTO keep.going    ' match then set cswitch to
    cswitch = r                             ' to the cycle that matches
    adjust y                                ' the current cycle. cswitch
    adjust r                                ' can never be set to 0 here
    GOTO done.it                            ' so R=0 is not checked.
keep.going:
  NEXT r
  GOTO done.it
keep.check:                            'Does the current state match
  IF cl(i) <> cl(r) THEN GOTO keep.chk ' part of a previous cycle.
  IF w(i) <> w(r) THEN GOTO keep.chk
  IF r = y THEN GOSUB Cyc.fnd.prt      'Cycle found if R=Y.
  adjust r
  GOTO done.it
keep.chk:                              'Cycle not found, reset cswitch
  cswitch = 0                          ' to try again.
  IF i - indx > 20 THEN indx = indx + 1 'If cycle not found by 20 then
  GOTO check1                          ' bring starting point forward
Cyc.fnd.prt:                           ' This prevent a problem
  IF reset1 = 99 THEN
    adjust cycle detection starting point
    GOTO keep.chk
  END IF
  fsm.cyc.time! = ....
  fsm.cyc.window = .....
  FOR temp = cswitch TO the correct y value
    fsm.cyc.time! = fsm.cyc.time! + cl(temp)   'Total of time and windows used
    fsm.cyc.window = fsm.cyc.window + w(temp)  ' for the entire fsm cycle.
  NEXT temp
  cld = 0                              ' and no longer branch to this subroutine.
  GOSUB Loop.adj                       'Adjust values because a loop is detected
done.it:
  RETURN
```

```
'   ┌─────────────────────────────────────────────────┐
'   │ 130:      This cycle period subroutine adjusts  │
'   │ all variables as a function of the period. This │
'   │ allows the iterative process to be terminated   │
'   │ because all the worse case values would have    │
'   │ been detected. Thruput time and packet count    │
'   │ needs to be adjusted and then process is        │
'   │ restarted for any left over cycles.             │
'   └─────────────────────────────────────────────────┘
Loop.adj:
   num.cyc.states = Number of states in a period
   fsmcyc! = Packets per period is calculated
   temp! = Number of packets that left arrival queue is calculated
   Packet count departed adjusted using K!
   i = Cycle number adjusted
   tt! = Adjust throughput time accumulated
   tot.w! = Adjust the window sum for util calc
   qt! = Adjust packets that arrive
   arcnt! = number of packets that arrived
   RETURN '   ┌─────────────────────────────────────────────────┐
'   │ 122: Virtual circuit entrance queue size calculation │
'   │ routine. This routine reports the packet build  │
'   │ up occurring at the system entrance queue which │
'   │ is often referred to as the window generator.   │
'   └─────────────────────────────────────────────────┘
Vc.ent.que:
   qt! = number of packets that arrive this cycle
   arcnt! = number of packets that arrived so far
   IF arcnt! > num.pius! THEN arcnt! = num.pius!   'arrivals can't exceed num.pius
   q! = System entrance queue size calculation
   Remember largest VC trans queue
   RETURN '   ┌─────────────────────────────────────────────────┐
'   │ 136:  Output subroutine prints values out to    │
'   │ the screen or to a printer.                     │
'   └─────────────────────────────────────────────────┘
Print.out:
   PRINT #2, perfromance values calculated for window protocol operation.
   PRINT #2, perfromance values calculated for window protocol operation.
   PRINT #2, perfromance values .................................
   PRINT #2,    .

PRINT #2,                          etc.
   RETURN

'   ┌─────────────────────────────────────────────────────────────────────┐
'   │              Configuration Delay Subroutine                         │
'   │                                                                     │
'   │ The purpose of this subroutine in to evaluate the delay characteristics of │
'   │ the physical resources described by the user and passed by VRD module. │
'   │ Each Node type or TG type takes a some fixed delay to               │
'   │ move a packet from one resource to another. This delay does not consider │
'   │ any queueing delays. This is taken care of by the main line cycle code. │
'   │                                                                     │
'   │ All fixed values generated depend on route configuration and packet size. │
'   │ The forward direction uses average packet size. The reverse         │
'   │ direction uses a special return packet size.                        │
'   │ All fixed delays are developed and stored in the "d!" array for the │
'   │ forward direction. Reverse direction is stored in the "r!" array.   │
'   │ Calculate all d!, sd!, cd!, and pg! values.                         │
'   │                                                                     │
'   │ This code has been modified to handle "non-work conserving" devices by │
'   │ tracking their delay in a special array. These devices consist      │
'   │ of channel delays and devices with half duplex operation. Channel delays │
'   │ are tracked by pacing request channel delay at each node via a variable │
'   │ Pacing response channel delays at each node are tracked by a different │
'   │ variable. Total channel delay at a node is tracked.                 │
'   └─────────────────────────────────────────────────────────────────────┘
Config.value:
   pacrsp! = .....                              'Set response size
   chenc! = (pkt size + hdr) / chan speed       'Channel encode delay - Request
   rspchenc! = (pkt size + hdr) / chan speed    'Channel encode delay - Response
   END IF
```

```
FOR sa = 1 TO number of links.
   FOR each SA then
      1) add each delay to a sum SA delays variable.
      2) find all channels associated with a SA and set channel delay
         values in the appropriate array locations
         ELSE if a non channel link is found THEN
            compute the proper propagation delay for it
            and compute the proper encoding delay for it
   NEXT sa
   FOR temp = 1 TO last node
      Sum up all channel delays for forward, reverse and total
      round trip.
   NEXT temp
      calculate Pacing response return time
      calculate total round trip delay
END IF '  ┌─────────────────────────────────────────────────┐
'  │  Variable initialization Subroutine:            │
'  │     Initialize all the program variables and flags to │
'  │     the proper values.                          │
'  └─────────────────────────────────────────────────┘

Var.init:
   linknum = ...                'Number of links
   vrtrans.q = ...              'Initialize the transmit queue
   switch = ...
   tt! = ...                    'tt! is the throughput time
   i = ...                      'cycle counter
   dsum! = ...                  'dsum! is the route link delays summed - forward
   rsum! = ...                  'rsum! is the route link delays summed - reverse
   max.ws.run = ...                 'Maximum window size found
   min.ws.run = ...                 'Minimum window size found
   tot.w! = ...                 'Total of all windows seen
   cswitch = ...                'Cycle switch set to 1st state of cycle detected
   arate.fct! = ...             'Arrival rate function used
   rsp.rtn.time! = ...          'Time for the pacing request to return
   tot.pg! = ...                'Propogation delay summed for the total route
   tot.sa.del! = ...            'Subarea delay summed for the total route
   tot.encode.del! = ...        'Encoding delay summed for the total route
   tot.resp.ch.wait! = ...      'Total pacing resp wait at channels
   tot.req.ch.wait! = ...       'Total pacing resp wait at channels
   cld = ...                    'FSM cycle loop detection switch
   FOR temp = 0 TO array size number       'initialize the following variables
      qpal!(temp)               'The initial LINK queue occupance is zero
      qpas!(temp)               'The initial NODE queue occupancy is zero
      qp!(temp)                 'Queue occupancy when the request leaves
      tqp!(temp)                'Time pacing request leaves the queue
      tmaxql!(temp)             'Time the maximum LINK queue occurs
      maxq.size!(temp)          'Reported maximum LINK queue size for entire run
      maxqs.size!(temp)         'Reported maximum NODE queue size for entire run
      exp.util(temp)            'Reported expected TG utilization for entire run
      pri.pk!(temp)             'number of packets to reach priority threshold
      wait.ch!(temp)            'Channel delay work array per subarea node
      req.wait.ch!(temp)        'Channel delay work array for pacing request
      resp.wait.ch!(temp)       'Channel delay work array for pacing response
   NEXT temp
   FOR temp = 1 TO the number of links
      rec.thp!(temp) = Recommended pri thrhld is the actual one
      rec.thc!(temp) = Recommended composite is the actual one
      pri.pk!(temp) = Convert threshold values to packets
   NEXT temp
RETURN
END
```

Although a specific embodiment of the invention has been disclosed, it will be understood by those having skill in the art that changes can be made to that specific embodiment without departing from the spirit and the scope of the invention.

What is claimed is:

1. A data processing method for improving the performance of a window protocol based data communications network including a sending node which sends a first window's worth of data packets during a first cycle on a first communications link in the network to an intermediate node having a queue, the queue outputting data packets at a departure rate on a second communications link in the network to a destination node and the intermediate node further outputting queue size information during the first cycle to the sending node, the destination node sending a marker to the sending node indicating the receipt of data packets from the first window's worth of data packets, the sending node sensing a second window's worth of data packets during a second cycle in response to having received the marker, the second window's worth of data packets having a size controlled by the queue size information, the method comprising the steps of:

inputting to a data processor a physical and logical network path description of said data communications network, including a size value of said first window's worth of data packets and a departure rate value for said departure rate;

computing in said data processor a first queue size information during the first cycle, from said size value of the first window's worth of data packets and said departure rate of the queue;

comparing in the data processor the first queue size information with a threshold queue size value;

computing in the data processor the size of the second window's worth of data packets, from the size of the first window's worth and the result of said comparing step;

computing a first cycle time duration of the first cycle necessary to transmit a data packet in the first window's worth of data packets from the sending node to the destination node and to transmit the marker from the destination node to the sending node;

storing the size of the first window's worth of data packets and the first cycle time in a table in the data processor;

computing in the data processor a second queue size information during the second cycle, from the size of the second window's worth of data packets and the departure rate of the queue;

comparing in the data processor the second queue size information with the threshold queue size value;

computing in the data processor the size of the next window's worth of data packets, from the size of the second window's worth and the result of said comparing step for said second cycle;

computing a second cycle time duration of the second cycle necessary to transmit a data packet in the second window's worth of data packets from the sending node to the destination node and to transmit the marker from the destination node to the sending node;

storing the size of the second window's worth of data packets and the second cycle time in said table in the data processor;

determining in said data processor from said table a period for a repetitive pattern of said cycle times and said window sizes;

computing in said data processor throughput value for said network from said cycle times in said period;

outputting a recommendation from said data processor for changes to network parameters and physical characteristics of said data communications network; and implementing said changes to network parameters and physical characteristics in said data communications network.

2. A data processing method for improving the performance of a window protocol based data communications network including a sending node which sends a first window's worth of data packets during a first cycle on a first communications link in the network to an intermediate node having a queue, the queue outputting data packets at a departure rate on a second communications link in the network to a destination node and the intermediate node further outputting queue size information during the first cycle to the sending node, the destination node sending a marker to the sending node indicating the receipt of data packets from the first window's worth of data packets, the sending node sending a second window's worth of data packets during a second cycle in response to having received the marker, the second window's worth of data packets having a size controlled by the queue size information, the method simulating the comprising the steps of:

inputting to a data processor a physical and logical network path description of said data communications network, including a size value of said first window's worth of data packets and a departure rate value for said departure rate;

computing in said data processor a first queue size information during the first cycle, from said size value of the first window's worth of data packets and said departure rate of the queue;

comparing in the data processor the first queue size information with a threshold queue size value;

computing in the data processor the size of the second window's worth of data packets, from the size of the first window's worth and the result of said comparing step;

computing a first cycle time duration of the first cycle necessary to transmit a data packet in the first window's worth of data packets from the sending node to the destination node and to transmit the marker from the destination node to the sending node;

storing the size of the first window's worth of data packets and the first cycle time in a table in the data processor;

computing in the data processor a second queue size information during the second cycle, from the size of the second window's worth of data packets and the departure rate of the queue;

comparing in the data processor the second queue size information with the threshold queue size value;

computing in the data processor the size of the next window's worth of data packets, from the size of the second window's worth and the result of said comparing step for said second cycle;

computing a second cycle time duration of the second cycle necessary to transmit a data packet in the second window's worth of data packets from the sending node to the destination node and to transmit the marker from the destination node to the sending node;

storing the size of the second window's worth of data packets and the second cycle time in said table in the data processor;

determining in said data processor from said table a period for a repetitive pattern of said cycle times and said window sizes;

computing in said data processor throughput value for said network from said cycle times in said period;

outputting a recommendation from said data processor for changes to network parameters and physical characteristics of said data communications network; and implementing said changes to network parameters and physical characteristics in said data communications network.

3. A data processing method for improving the performance of a window protocol based data communications network including a sending node which sends a first window's worth of data packets during a first cycle on a first communications link in the network to an intermediate node having a queue, the queue outputting data packets at a departure rate on a second communications link in the network to a destination node and the intermediate node further outputting queue size information during the first cycle to the sending node, the destination node sending a marker to the sending node indicating the receipt of data packets from the first window's worth of data packets, the sending node sending a second window's worth of data packets during a second cycle in response to having received the marker, the second window's worth of data packets having a size controlled by the queue size information, the method comprising the steps of:

- inputting to a data processor a physical and logical network path description of said data communications network, including a size value of said first window's worth of data packets and a departure rate value for said departure rate;
- computing in said data processor a first queue size information during the first cycle, from said size value of the first window's worth of data packets and said departure rate of the queue;
- comparing in the data processor the first queue size information with a threshold queue size value;
- computing in the data processor the size of the second window's worth of data packets, from the size of the first window's worth and the result of said comparing step;
- computing a first cycle time duration of the first cycle necessary to transmit a data packet in the first window's worth of data packets from the sending node to the destination node and to transmit the marker from the destination node to the sending node;
- storing the first queue size and the first window size in a table in the data processor;
- computing in the data processor a second queue size information during the second cycle, from the size of the second window's worth of data packets and the departure rate of the queue;
- comparing in the data processor the second queue size information during the second cycle, from the size of the second window's worth of data packets and the departure rate of the queue;
- comparing in the data processor the second queue size information with the threshold queue size value;
- computing in the data processor the size of the next window's worth of data packets, from the size of the second window's worth and the result of said comparing step for said second cycle;
- whereby said second throughput value more closely approximates a desired throughput value.

4. The method of claim 3 which further comprises the steps of:

- following the steps of computing the throughput value of the network from said cycle times in said period, selecting a second threshold queue size value;
- repeating said steps of computing in a data processor a first queue size information during the first cycle and then;
- comparing in the data processor the first queue size information with said second threshold queue value;
- using said second threshold queue size value in the subsequent steps:
- computing a second throughput value for said network from said cycle times in said period, having a use of said second threshold queue size value;
- whereby said second throughput value more closely approximates said desired throughput value.

5. The method of claim 3, wherein said step of determining said repetitive pattern includes determining a repetitive pattern for window sizes, queue sizes, cycle times, arrival patterns and output patterns.

* * * * *